May 3, 1949.　　　　R. BREMER　　　　2,469,151
AUTOMOBILE DOOR REPAIR BENCH

Filed Sept. 18, 1946　　　　2 Sheets-Sheet 1

Inventor
Richard Bremer,
By Clarence A. O'Brien
and Harvey B. Jacobson
Attorneys May 3, 1949.  R. BREMER  2,469,151
AUTOMOBILE DOOR REPAIR BENCH
Filed Sept. 18, 1946  2 Sheets-Sheet 2

Inventor
Richard Bremer,
By Clarence A. O'Brien
and Harvey B. Jacobson
Attorneys Patented May 3, 1949

2,469,151

UNITED STATES PATENT OFFICE 2,469,151

AUTOMOBILE DOOR REPAIR BENCH

Richard Bremer, Muskegon, Mich.

Application September 18, 1946, Serial No. 697,757

9 Claims. (Cl. 153—32)

This invention relates to a repair bench for mounting and facilitating the repair and straightening of automobile doors, hoods and other irregularly shaped metallic parts of an automobile body.

The object of the invention is to provide a relatively simple, strong and durable repair bench for parts of the character stated, especially automobile doors, whereby dents therein may be pressed out or straightened, especially for pushing out the bottom of a door, as a facility for putting the frame thereof in shape and in pushing out dents.

Another object of the invention is to provide novel means for clamping the door or like parts in position for action thereon by body jacks or straightening devices and for convenient access thereto by the mechanic or operator, the bench being designed to support the door or parts to be straightened in convenient position for access thereto and so constructed as to withstand considerable stress and pressure during the straightening operation, and to conveniently support tools and clamps for securely fastening the door or parts to be straightened to the bench.

Other objects and advantages reside in the details of construction and operation as more fully hereinafter described and claimed, reference being had to the accompanying drawings forming part hereof, wherein like numerals refer to like parts throughout, and in which:

Figure 1:
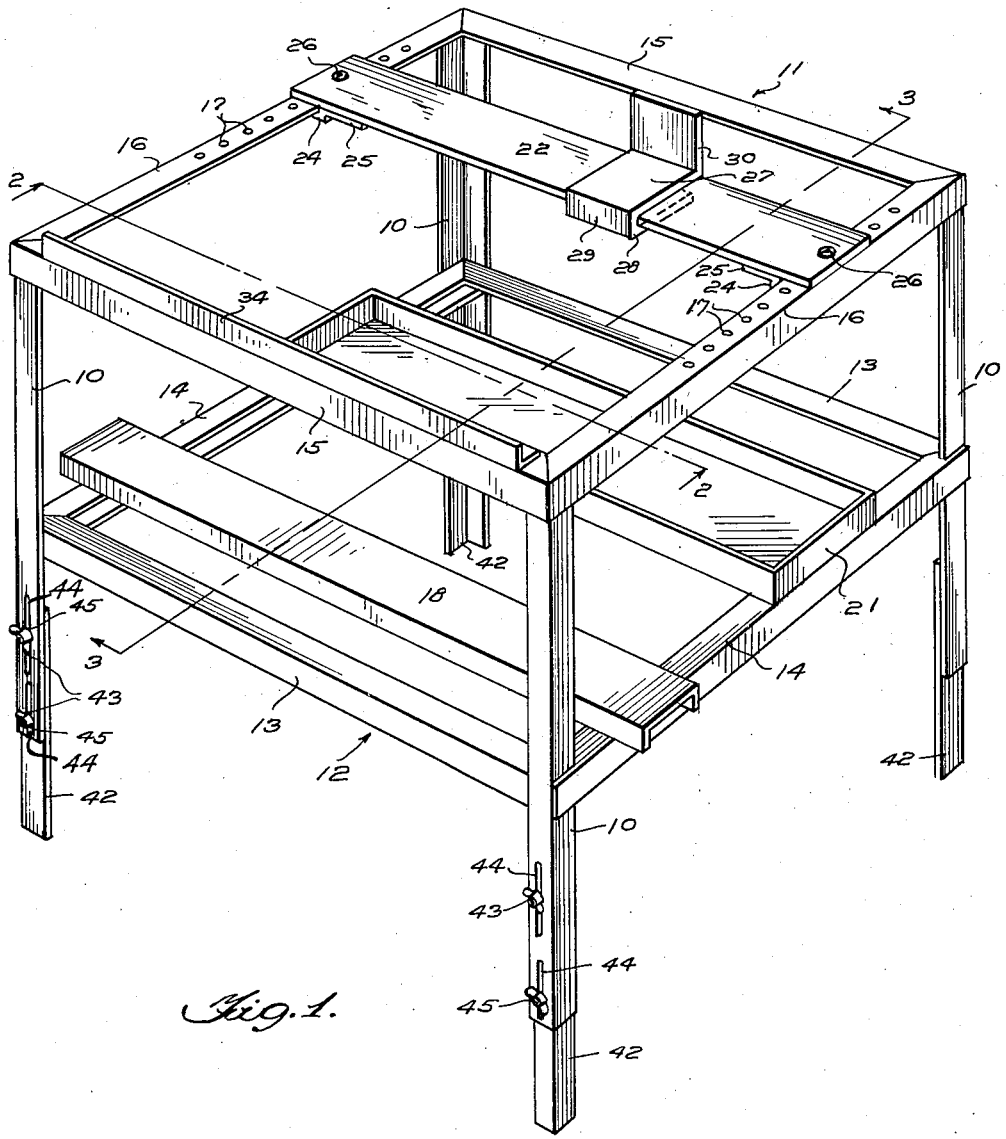
Figure 1 is a perspective view of an automobile repair bench constructed in accordance with the invention.
Figure 2:
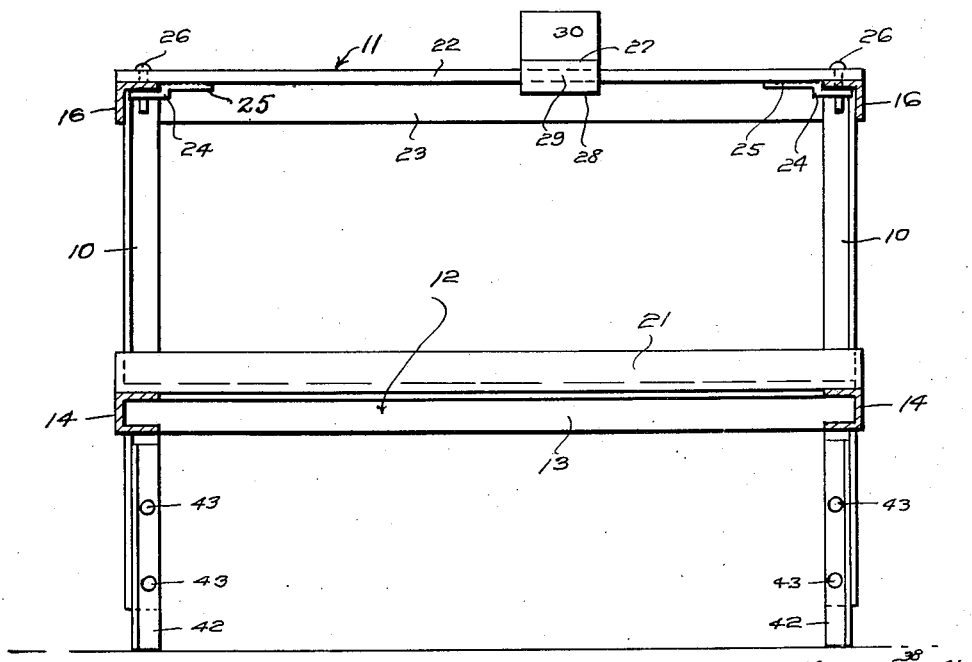
Figure 2 is a sectional view taken transversely on the line 2—2 of Figure 1.

Referring to the drawings in detail, in which like reference characters designate corresponding parts throughout the several views, the repair bench is shown as comprising an open frame consisting of corner legs 10 braced by a top frame 11 and a lower frame 12 of rectangular form, which may be of any size desired, but which is preferably 40" by 48" in plan and approximately 38" high. The corner legs are connected at the front and back within the angle iron legs or upright corner posts 10 by cross-bars 13, the ends of which may be welded within the flanges of the corner legs 10. At the sides, the legs 10 are connected by channels or pairs of angle bars 14 likewise welded within the flanges of the corner legs. The top frame is constructed entirely of angle iron members secured to the upper ends of the corner legs 10 and comprising front and rear cross-bars 15 and side bars 16 the latter of which are provided with a plurality of equi-distantly spaced holes 17, preferably ten in number and spaced 2" apart or 10" along the bars 16 at each side of the longitudinal center of the bench or table at the top thereof.

Figure 3:
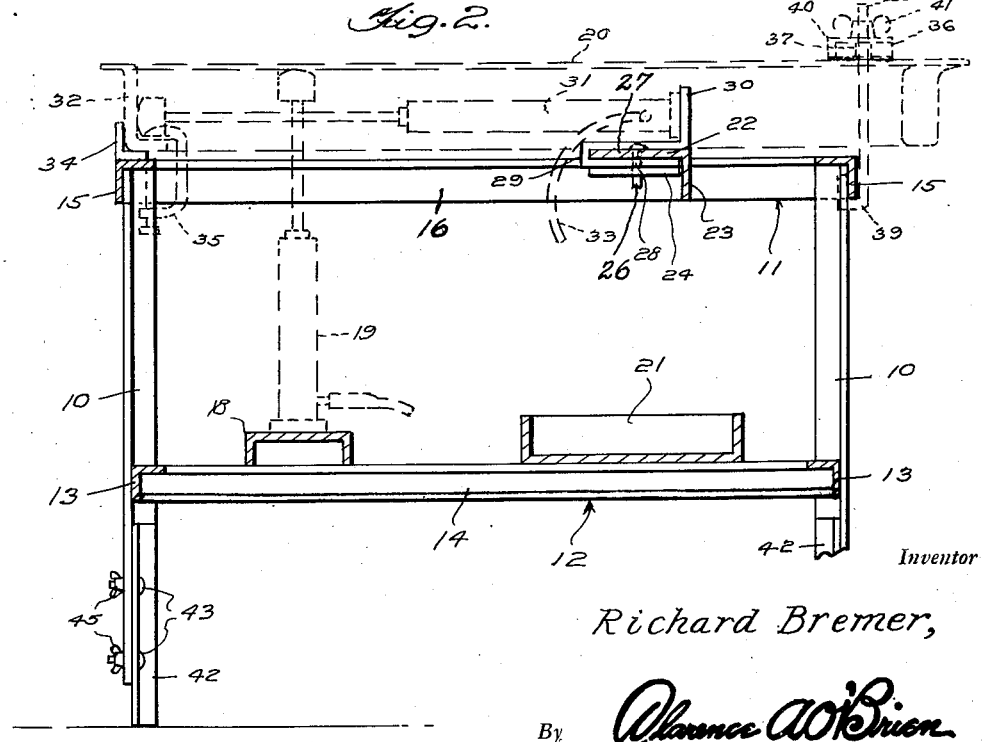
Figure 3 is a similar view taken on the line 3—3 of Figure 1 at right angles to Figure 2.

The horizontal bars 14 are adapted to support an inverted channel bar 18, adapted to take the pressure of a body jack 19, for straightening out the wall of an automobile door or the like 20 as shown in Figure 3 of the drawings. The bars 14 are also designed to slidably support a shallow tray 21, for containing tools to be used by the mechanic. This tray may be of wood or otherwise, and is removable.

Extending across the bars 16 at the top, is an angle iron support bar 22 having a depending stiffening flange 23 extending vertically at the back. Offset plates 24 are welded or otherwise secured as at 25 to the end portions of the bar 22 either at the top or bottom, providing spaced jaws, to engage the inwardly extending horizontal flanges of the side bars 16 and are suitably apertured to receive pins 26 which engage the holes 17, for adjustment along the bars 16. Slidable on the bar 22 is a bracket 27 having a rebent lower portion 28 of U-shaped form, the bight portion 29 of which engages the front edge of the bar 22, while the rear end of the top portion of the bracket extends upwardly to form a flange 30 against which a body jack 31 is designed to be placed upon the bracket 27 to engage the end 32 of the door 20, to straighten the door frame by exerting pressure thereagainst supplied from a pump through a conduit 33 the same as the jack 19. The front bar 15 is also provided with an angle iron 34 molded or welded thereto in line with the depending front flange of the bar 15, against which the frame 32 engages when the door rests upon the top of the bench, so that the bottom of the door will abut thereagainst. In addition, the door may be held by a C-clamp or a plurality of such C-clamps 35 against the flanged bar 34 and the bottom of the front bar 15 beneath its inwardly extending horizontal flange. The top of the door may be held by a slotted wooden bar 36 having a longitudinal slot 37 by a bolt 38 having a hook 39 at the lower end designed to engage beneath the depending flange of the rear cross-bar 15 and held by an angle plate 40 beneath a wing nut 41. The plate 40 is disposed over the bar 36 and down along the front edge thereof at each end or along the length of the slot 37 with an interposed piece of felt between the bar and the surface metal of the door, to prevent marring of the latter.

Provision is made for lengthening the corner legs 10, in order that the bench may be raised or lowered by adjustable leg sections 42 so that the top of the bench is adjustable between 36″ and 41″ high. Bolts 43 have their heads welded to the inside surfaces of the extension legs or sections 42 and project outwardly to pass through elongated slots 44 in the corner legs 10 at the front and back, for engagement by wing nuts 45, in order to tighten the bolts and the adjustable sections 42 in adjusted position.

Thus, a bench of the character stated may be used for the repair of automobile doors, hoods and other irregular parts, and the open frame permits easy access to both sides of the door for dolly and hammer work in addition to the use of the body jacks 19 and 31 as described, for pushing out the door panel and straightening the frame of the door in the manner indicated and for other miscellaneous straightening work. By using the channels 14, or angle irons placed against each other, the side bars 16 are rendered very rigid, in order to sustain the pressure of the jack 19 against the channel 18, in pressing out dents in the surfaces of the metal of the door panel and other parts. Also, by the use of this bench, the repair and straightening of the various parts is not only greatly facilitated but expedited so that the same can be very economically accomplished.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A repair bench of the class described comprising a frame having vertical legs at the corners, an upper frame and a lower frame connected to said legs in spaced parallel relation at the top and intermediate portions of the height of the legs, a cross-bar adjustably secured to the side cross-bars of the upper frame, a bracket slidably disposed on said cross-bar and having an upstanding portion, means for securing the bracket on the cross bar to resist pressure exerted against the face of the upstanding portion, a flange at the front of the top frame, means disposed on said flange for supporting a door between the flange and bracket means for supporting a jack on the lower frame including a bar slidable along the lower frame at the sides thereof.

2. A repair bench of the class described comprising a frame having vertical legs at the corners, an upper frame and a lower frame connected to said legs in spaced parallel relation at the top and intermediate portions of the height of the legs, a cross-bar adjustably secured to the side cross-bars of the upper frame, a bracket slidable on said cross-bar and having an upstanding portion means for securing the bracket on the cross bar whereby pressure may be exerted against the face of the upstanding portion, a flange secured at the top of the frame in complementary relationship with the face of the upstanding portion, said lower frame adapted to support a tray thereon, an inverted channel supported along the sides of the lower frame to bear a body jack pressing upwardly against the door panel or the like supported at the top of the frame between said upstanding portion and flange, and means for securing the door to the upper frame.

3. A repair bench of the class described comprising a frame having vertical legs at the corners, an upper frame and a lower frame connected to said legs in spaced parallel relation at the top and intermediate portions of the height of the legs, a cross-bar means for adjustably securing said cross-bar to the side cross-bars of the upper frame, a flange formed at the top of the frame, a bracket adjustably carried by the cross bar, means for securing said bracket to the cross bar whereby a work piece may be positioned between the bracket and flange said lower frame adapted to support a tray thereon, an inverted channel supported along the sides of the lower frame to support a body jack pressing upwardly against the door panel or the like supported at the top of the frame between said upstanding portion and flange, and adjustable extensions on the corner legs to adjust the length thereof and the height of the top frame of the bench.

4. A repair bench comprising corner legs of angle iron, a lower frame comprising front and rear angle iron cross members connecting the front and rear legs intermediate the height thereof, a top frame comprising angle iron members at the front and sides of said corner legs and having depending outer flanges and inwardly extending top flanges, cross-bars connecting the corner legs between the angle iron members of the lower frame, a tray slidable along said cross members, an inverted channel member also slidable along said cross members, said horizontal flanges of the side bars of the upper frame having a plurality of spaced perforations, a cross-bar resting on said flanges at the perforations, offset strips secured on the end portions of said cross-bar and providing grooves for engaging said flanges, the end portions of the cross bar and strips having aligned openings, pins insertable in said openings and the perforations of the flanges to adjust the cross-bar back and forth, a slidable bracket on the cross-bar having a rebent portion extending under the same and a bight portion engaging the front edge of the bar, the top of the bracket having an upwardly extending portion at the back, an angle flange at the front bar of the top frame, means for securing a door or part to be straightened to the front cross member and means for securing the door to the rear cross member.

5. A repair bench comprising corner legs of angle iron, a lower frame comprising front and rear angle iron cross members connecting the front and rear legs intermediate the height thereof, a top frame comprising angle iron members at the front and sides of said corner legs and having depending outer flanges and inwardly extending top flanges, cross-bars connecting the corner legs between the angle iron members of the lower frame, a tray slidable along said cross members, an inverted channel member also slidable along said cross members, said horizontal flanges of the side bars of the upper frame having a plurality of spaced perforations, a cross-bar resting on said flanges at the perforations, offset strips secured on the end portions of said cross-bar and providing grooves for engaging said flanges, the end portions of the cross-bar and strips having aligned openings, pins insertable in said openings and the perforations of the flanges to adjust the cross-bar back and forth, a slidable bracket on the cross-bar having a rebent portion extending under the same and a bight portion engaging the front edge of the bar, the top of the bracket having an upwardly extending portion at the back, an angle flange at the front bar of the top frame, said flange at the front of the frame and the upwardly extending portion adapted to receive an automobile door or the like therebetween, and said bracket and upstanding portion adapted to take a body jack against the same in horizontal position for pressing the bottom of the door frame to straighten the same, the channel designed to take a body jack to exert upward pressure on the panel of the door along the length of said channel, means for anchoring the door to the front frame member, a bar adapted to extend over the top of the door and having a longitudinal slot therein, bolts engaged through the slot and having hooks adapted to extend downwardly and to engage under the rear member of the top frame to securely mount and fasten the door thereto against upward pressure.

6. A repair bench of the class described comprising a frame having corner legs, and top and bottom frames in spaced parallel relation on the legs, a cross member adjustably secured to the sides of the upper frame, a bracket slidably disposed on said cross-bar and having an upwardly extending stop member, means for securing said bracket to one of the side edges of the cross bar, an upstanding flange at the front of the frame, and means for anchoring a door or part to be straightened between said bracket and flange at the front of the frame.

7. A repair bench of the class described comprising a frame having corner legs, and top and bottom frames in spaced parallel relation on the legs, a cross member slidably secured to the sides of the upper frame, a bracket adjustably disposed on said cross-bar and having an upwardly extending stop member, means for securing the bracket to one of the side edges of the cross bar, an upstanding flange at the front of the frame, means for securing a door between the flange and bracket, extension legs for the corner legs, comprising short sections, said corner legs having slots therein, bolts carried by said sections and extending through the slots, and means for fastening said bolts to adjust the height of the bench up and down.

8. A repair bench comprising corner legs, an open frame connecting the upper ends of the legs in spaced horizontal fashion, an upstanding portion secured at one side of the frame, means extending between the sides of the frame joining with the aforesaid side and adjustably secured thereon for adjustment toward and away from said upstanding portion and a bracket member adjustably secured on said means for adjustment longitudinally thereof.

9. A repair bench comprising corner legs, upper and lower frames connecting the legs in spaced horizontal fashion, an upstanding portion secured at the front of the frame, a bracket member carried by the upper frame, means for adjustably securing the bracket member on the upper frame for adjustment toward and away from said upstanding portion and means for supporting a jack on the lower frame to press upwardly against a door panel or work piece supported by the upstanding members.

RICHARD BREMER.

REFERENCES CITED

The following references are of record in the file of this patent:

UNITED STATES PATENTS

| Number | Name | Date |
| --- | --- | --- |
| 1,000,070 | Camp et al. | Aug. 8, 1911 |
| 1,954,708 | Mass | Apr. 10, 1934 |